United States Patent [19]

Wolff et al.

[11] 4,229,333
[45] Oct. 21, 1980

[54] CROSS-LINKABLE RUBBER MIXTURES CONTAINING SILICATE FILLERS AND PROCESS FOR CROSS-LINKING

[75] Inventors: Siegfried Wolff, Bornheim-Merten; Ewe H. Tan, Wesseling-Berzdorf, both of Fed. Rep. of Germany

[73] Assignee: Deutsche Gold- und Silber-Scheideanstalt vormals Roessler, Frankfurt, Fed. Rep. of Germany

[21] Appl. No.: 34,203

[22] Filed: Apr. 27, 1979

Related U.S. Application Data

[63] Continuation of Ser. No. 835,848, Sep. 22, 1977, abandoned, which is a continuation of Ser. No. 609,815, Sep. 2, 1975, abandoned.

[30] Foreign Application Priority Data

Aug. 18, 1975 [DE] Fed. Rep. of Germany ....... 2536674

[51] Int. Cl.² .......................... C08K 3/36; C08K 5/54
[52] U.S. Cl. .................... 260/23.7 M; 260/23 H; 260/23.7 N; 260/23.7 H; 260/23.7 B; 260/23.7 C; 260/33.6 AQ; 260/42.29; 260/42.33; 260/42.34; 260/42.35; 260/42.36; 260/42.37; 260/42.39; 260/762; 260/763; 260/765
[58] Field of Search ............... 260/42.37, 42.39, 42.33, 260/42.36, 42.35, 762, 23.7, 23.7 M, 23.7 N, 23.7 H, 23.7 B, 23.7 C, 33.6 AQ, 42.29, 42.34, 763, 765

[56] References Cited

U.S. PATENT DOCUMENTS

| | | | |
|---|---|---|---|
| 3,873,489 | 3/1975 | Thurn et al. | 260/33.6 AQ |
| 3,938,574 | 2/1976 | Burmester et al. | 152/330 R |
| 4,000,119 | 12/1976 | Schwarze et al. | 260/79.5 R |

*Primary Examiner*—James H. Derrington
*Attorney, Agent, or Firm*—Cushman, Darby & Cushman

[57] ABSTRACT

Sulfur containing organosilicon compounds having the formula:

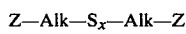

in which Z is:

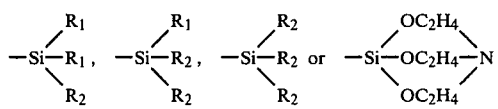

where $R_1$ is alkyl of 1 to 4 carbon atoms, cycloalkyl of 5 to 8 carbon atoms or phenyl and $R_2$ is alkoxy of 1 to 4 carbon atoms, cycloalkoxy of 5 to 8 carbon atoms or phenoxy. Alk is a divalent aliphatic hydrocarbon or a cyclic hydrocarbon group containing 1 to 8 carbon atoms and x is a number from 2 to 6 are used as cross-linking agents in rubber mixtures containing conventional vulcanization accelerators and a siliceous filler, and optionally carbon black. No sulfur is present.

83 Claims, No Drawings

CROSS-LINKABLE RUBBER MIXTURES CONTAINING SILICATE FILLERS AND PROCESS FOR CROSS-LINKING

This is a continuation of application Ser. No. 835,848 filed Sept. 22, 1977, now abandoned, which is a continuation of Ser. No. 609,815, filed Sept. 2, 1975 now abandoned.

The invention is directed to a cross-linkable rubber mixture which contains a siliceous filler and contains no elemental sulfur. The invention also is directed to a process for cross-linking these rubber mixtures wherein the cross-linking takes place through special multi-reactive chemical materials, preferably at the interface between the rubber and a siliceous filler, e.g., silica or a silicate.

It is known and conventional to vulcanize filler containing rubber compositions with sulfur or sulfur and vulcanization accelerators. Furthermore other vulcanization systems have been employed such as peroxides, tetraalkylthiuram-polysulfides, zinc oxide and other metal oxides, polysulfidic aminotriazine compounds, resins, etc. In practice most frequently the accelerated sulfur vulcanization is carried out which, in regard to the amount of cross-linking is not damaged by many fillers, such as furnace black, for example. In contrast siliceous fillers, especially finely divided silicas (such as Ultrasil® VN3, Ultrasil® VN2 and Aerosil® of Degussa), can considerably reduce the amount of cross-linking. To the person skilled in the art a thoroughly familiar rule is that the vulcanization of elastomers requires considerably higher amounts of sulfur and accelerators if silicas are employed as fillers, without the properties of the vulcanizate reaching those obtained with carbon black containing vulcanizates.

It is further known that elastomers can be cross-linked with organic polysulfides such as, for example, polysulfidic aminotriazine compounds, see Westlinning British Pat. No. 1,353,532 and also Wolff U.S. Pat. No. 3,775,366. It is also known to carry out the vulcanization of siliceous filler containing rubber mixtures with a cross-linking system such as sulfur and accelerators in the presence of sulfur containing organosilanes (German Offenlegungsschrift 2,255,577, Thurn U.S. Pat. No. 3,873,489 and Hess U.S. Pat. No. 3,768,537.

It has now been unexpectedly found that siliceous filler containing rubber compositions can be worked to valuable rubber products without the addition of elemental sulfur by adding certain sulfur containing silanes to the composition. The cross-linkable rubber compositions of the invention contain, besides the customary optional ingredients of the mixture as for example antiagers, heat stabilizers, light stabilizers, ozone stabilizers, processing aids, plasticizers, adhesives agents, propellants, pigments, waxes, fillers (as for example sawdust), organic acids (as for example stearic acid, benzoic acid or salicylic acid), lead oxide, zinc oxide and/or activators (as for example triethanolamine, polyethylene glycol or hexanetriol) at least one rubber (e.g., a cross-linkable rubber), at least one siliceous filler (e.g., silica or a silicate) in an amount of 1 to 300 parts by weight, carbon black in an amount of 0 to 300 parts by weight, at least one vulcanization accelerator known to be useful in sulfur vulcanization of rubber in an amount of 0.02 to 10 parts by weight and at least one organosilane of the formula:

$$Z-alk-S_x-alk-Z$$

in which Z is:

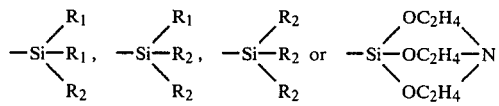

and in which $R_1$ is an alkyl group of 1 to 4 carbon atoms, cycloalkyl group with 5 to 8 carbon atoms or phenyl and $R_2$ is an alkoxy group with 1 to 4, preferably 2, carbon atoms, a cycloalkoxy group with 5 to 8 carbon atoms or the phenoxy group. All the $R_1$ and $R_2$ groups can be the same or different. Alk is a divalent hydrocarbon group with 1 to 8 carbon atoms. It can be straight or branched chain and can be a saturated aliphatic hydrocarbon group, an unsaturated aliphatic hydrocarbon group or a cyclic hydrocarbon group. Preferably alk has 2 or 3 carbon atoms and x is a number of 2 to 6, preferably 2 to 4, more preferably 3 to 4 in an amount of 0.2 to 40 parts per 100 parts by weight of siliceous filler. Except for the organosilane the parts of all of the materials set forth above are based on 100 parts by weight of the rubber.

In case in addition to the siliceous filler there is optionally also present carbon black in the new rubber compositions, the total amount of filler is suitably limited by a maximum of about 300 parts by weight based on 100 parts by weight of rubber. As can be seen e.g. in Example I, Example II with accelerators 4,6,8 and 9, Example III with accelerators 10,11,13,14,15,16,17,19,20 and 21, Example IV with accelerators 22,23,25,26,27,-28,29,31,32,34,35 and 36, Example V with accelerators 37,38,40,41,42,43,44,46,47,48,49,50 and 51 and Example VIII, the sulfur containing organosilicon compound can be the sole vulcanizing agent present.

An additional object of the invention is the development of a process for cross-linking rubber compositions in which the rubber composition containing at least one rubber, at least one siliceous filler in an amount of 1 to 300 parts by weight, carbon black in an amount of 0 to 300 parts by weight, at least one known vulcanization accelerator for rubber vulcanization in an amount of 0.02 to 10 parts by weight and at least one organosilane of Formula I in an amount of 0.2 to 40 parts by weight per 100 parts by weight of siliceous fillers wherein the rest of the named parts by weight are based on 100 parts by weight of the rubber, as well as in a given case additional customary additives for rubber compositions is worked in known manner and heated to a temperature of 100° to 200° C. for a time of 3 to 200 minutes, the time required varying inversely with the temperature.

Advantageously the rubber composition of the invention also contains zinc oxide in an amount of 0.05 to 10 parts by weight as well as stearic acid in an amount of 0.05 to 10 parts by weight, both being based on 100 parts by weight of the rubber.

The production of rubber compositions as well as molding and the vulcanization take place according to conventional processes in the rubber industry. In this regard reference is made for example to the literature "Kautschuk-Handbuch" published by Dr. Siegfried Boström (Verlay Berliner Union, Stuttgart, 1959) and A. S. Craig "Rubber Technology" (London, 1963).

As rubbers usable in the present invention there may be mentioned all rubbers still containing double bonds cross-linkable to elastomers, especially halogen free rubbers, preferably the so-called diene elastomers.

The rubber mixtures can be produced with one or more, optionally oil-extended, natural and/or synthetic rubbers. These include especially natural rubber, polybutadiene, polyisoproprene, e.g., cis-polyisoprene, butadiene- styrene copolymer, butadiene-acrylonitrile copolymer, polymerized 2-chlorobutadiene, also butyl rubber, halogenated butyl rubber such as chlorinated butyl rubber, brominated butyl rubber as well as other known diene rubbers as for example terpolymers of ethylene, propylene and for example non-conjugated dienes and also non-conjugated polyenes, e.g., ethylene-propylene-cyclooctadiene, ethylene-propylenenorbornadiene, ethylene-propylene dicyclo-pentadiene and ethylene-propylene-cyclododecatriene. Also there can be used trans-polypentenamer, carboxy or epoxy rubbers and the like known elastomers as well as ethylene-vinyl acetate copolymer, ethylene-propylene copolymer as well as mixtures of the named types of rubbers. In a given case chemical derivatives of natural rubber, as well as modified natural rubber can be used.

The term "siliceous filler" is a broad term and refers to fillers which are rubber compatible or can be worked into rubber mixtures which fillers consist of silicates or silica, or contain silicates or silica and/or contain chemically bound silicates (or silica) in the widest sense, including mixtures of two or more siliceous fillers. Especially counted as siliceous fillers are:

Highly dispersed silica (silicon dioxide) having a specific surface area in the range of about 5 to 1000, preferably 20 to 400 m$^2$/g (determined with gaseous nitrogen according to the known BET procedure) and with primary particle sizes in the range of about 10 to 400 nm. (nanometer, $10^{-9}$ meters), which can be produced, for example, by precipitation from solutions of silicates, by hydrolysis and/or oxidative high temperature conversion. There can also be used fillers produced by flame hydrolysis of volatile silicon halides, e.g., silicon tetrachloride, or the electric arc processes. These silicas, in a given case, can also be present as mixed oxides or oxide mixtures with oxides of the metals aluminum (alumina), magnesium (magnesium oxide), calcium (calcium oxide), barium (barium oxide), zinc (zinc oxide), zirconium (e.g., zirconium dioxide), or titanium (e.g., titanium dioxide).

Synthetic silicates, for examples, aluminum silicate or alkaline earth silicates such as magnesium, or calcium silicate with specific surface areas of about 20 to 400 m$^2$/g and primary particles sizes of about 10 to 400 nm.

Natural silicates, for example, kaolin, wollastonite, talc and asbestos as well as natural silicas, e.g., quartz or sand.

Glass fibers and glass fiber products such as mats, webs, strands, fabrics, non-woven fabrics and the like as well as microglass balls (microglass balloons).

The siliceous fillers mentioned can be added preferably in amounts of about 10 or, in a given case, even less, up to about 250 parts by weight based on 100 parts by weight of rubber polymer.

As filler mixtures there can be used, for example, silica-kaolin or silica-glass fibers-asbestos, as well as blends of siliceous reinforcing fillers with the mentioned rubber blacks, for example, silica-ISAF carbon black or silica-glass fiber cords HAF carbon black.

Typical examples of siliceous fillers usable in the invention, for example, are those produced by Deguassa, such as silica or silicates under the tradenames Aerosil, Ultrasil, Silteg, Durosil, Extrusil, Calsil, etc. Preferred as siliceous fillers are the named highly dispersed or active silicas, especially precipitated silicas, in an amount of 10 to 150 parts by weight based on 100 parts by weight of rubber.

Additionally carbon black can be present in the rubber compositions of the invention, not only for gray or black pigmentation of the vulcanizate, but for the production of especial valuable vulcanization properties, wherein the known rubber blacks are present. These valuable properties in no way could have been foreseen. Preferably the carbon black is present in an amount of 0 to 150 parts by weight based on 100 parts by weight of rubber in the new rubber mixture. When present the amount of carbon black is at least 0.1 part per 100 parts of rubber.

In the case of the presence of siliceous fillers and carbon black in the rubber compositions the total amount of filler based on 100 parts by weight of rubber is limited to a maximum of 300 parts by weight, preferably up to 150 parts by weight.

The new rubber compositions also always contain one or more accelerators, which term is understood to mean the known vulcanization accelerators, such as dithiocarbamate, xanthogenate and thiuram accelerators, as well as thiazole accelerators, including the mercapto and sulfenamide accelerators, amine accelerators or aldehyde-amine accelerators, basic accelerators, in which for example the guanidine accelerators and other basic accelerators are included; see "Vulkanisation and Vulkanisation-hilfsmittel" collected presentation of Dr. W. Hofmann, Leverkusen (Verlag Berliner Union, Stuttgent, 1965, pages 114 et seq., especially page 122), as well as—independent of the above classification—the general vulcanization accelerator classes of the mercapto-, disulfide-, sulfenamide-, thiazole—and thiourea accelerators. Especially there can be employed thiuram accelerators which are essentially the tetraalkyl or dialkyl diaryl thiuram mono-, and disulfides such as tetramethyl thiurammonosulfide, tetramethyl thiuramdisulfide, tetraethyl thiuramdisulfide, dipentamethylene thiuram monosulfide, and disulfide, dimethyl diphenyl thiuramdisulfide, diethyl diphenyl thiuramdisulfide, etc.

The dithiocarbamate accelerators are in general derivatives of the dialkyl, alkylcycloalkyl, and alkylaryl dithiocarbamic acids. Among the known members of this accelerators class are N-pentamethylene ammonium-N$^1$-pentamethylene dithiocarbamate and the zinc dialkyl dithiocarbamates, e.g., zinc diethyl dithiocarbamate, zinc dimethyl dithiocarbamate, zinc dibutyl dithiocarbamate.

Xanthogenate accelerators are the known derivatives of alkyl and aryl xanthogenic acids as for example zinc ethyl xanthogenate, zinc n-butyl xanthogenate.

Among the mercapto accelerators there are included especially 2-mercapto-benzothiazole, 2-mercaptoimidazoline, mercaptothiazolines as well as the series of monomercapto and dimercaptotriazine derivatives (see for example British Pat. No. 1,095,219 and related Westlinning U.S. Pat. No. 3,366,598 the entire disclosures of which are hereby incorporated by reference and relied upon). Examples of mercaptotriazine accelerators are for example 2-diethanolamino-4,6-bis-mercaptotriazine and 2-ethylamino-4-diethylamino-6-mercapto-s-triazine.

Disulfide and sulfenamide accelerators are for example disclosed in British Pat. No. 1,201,862 and related Westlinning U.S. Pat. No. 3,801,537, the entire disclosures of which are hereby incorporated by reference and relied upon. Among such accelerators are 2-diethylamino-4,6-bis-(cyclohexyl-sulfenamido)-s-triazine, 2-di-n-propylamino-4,6-bis-(N-tert.butyl-sulfenamido)-s-triazine as well as N-cyclohexyl-2-benzothiazole sulfenamide. Among the disulfide accelerators there may be mentioned for example bis-(2-ethylamino-4-diethylamino-triazin-6-yl)-disulfide, bis-(2-methylamino-4-di-isopropylamino-triazin-6-yl)-disulfide as well as dibenzothiazyl disulfide.

Among the aldehydeamine accelerators are included saturated and unsaturated aliphatic aldehyde reaction products with ammonia, aliphatic or aromatic amines, as for example butyraldehyde-aniline and butyraldehyde-butylamine. Other aldehyde-amines include formaldehyde-aniline, 2-ethyl-2-hexenalaniline, triethyltrimethylenetriamine and hexamethylenetetramine. Other basic accelerators are for example guanidine derivatives such as diphenyl guanidine and di-o-tolyl guanidine. Among the thiourea accelerators there are included for example thiourea itself and the diaryl thioureas such as 1,3-diphenyl-2-thiourea.

There can also be used two, three or more accelerators in the new rubber compositions of the invention, especially the known accelerator mixtures employed in rubber technology.

Preferably the new rubber compositions also contain antiagers or mixtures of known antiagers.

It can also be of special advantage if the rubber composition, especially for the production of the tread strips for automobile tires, has mixed therein plasticizer oils, for example highly aromatic or naphthenic plasticizer oils. For winter tire treads, for example, these should have a low cold setting point namely, a cold setting point between 0° and −60° C., preferably between −10° and −55° C. The proportion of plasticizer oil can amount to more than 5 or 10 parts but can also be more than 40 up to 100 parts by weight based on 100 parts by weight of rubber. For tire treads of winter tires, which are especially suited for streets covered with ice and solid snow, the preferred limits of plasticizer oil to use in the rubber composition are between 3 and 80 parts by weight per 100 parts by weight of rubber.

The oligosulfidic organosilanes according to the above given formula I are known and can be made according to known processes (see Belgian Pat. No. 787,691, Meyer-Simon U.S. Pat. No. 3,842,111 and Thurn U.S. Pat. No. 3,873,489, the entire disclosures of these three patents are hereby incorporated by reference and relied upon.)

Examples of organosilanes within formula I which can be used in the invention are bis[trialkoxysilylalkyl-1)]-polysulfides such as bis[2-trimethoxy-, -triethoxy-, -tri-(methyl-ethoxy)-, -tripropoxy-, tributoxy, tri-i-propoxy- and tri-i-butoxy silylethyl]-polysulfides, namely the di-, tri-, tetra-, penta-, and hexasulfides, further the bis-[3-trimethoxy-, -triethoxy-, tri-(methylethoxy)-, tripropoxy-, tri-i-propoxy-, -tributoxy- and tri-i-butoxy silylpropyl]-polysulfide, namely again the di-, tri-, tetra-, penta- and hexa-sulfide; furthermore the corresponding his[3-trialkoxysilylisobutyl]-polysulfides, the corresponding bis[4-trialkoxysilyl-butyl]-polysulfides and so forth up to bis[8-trialkoxysilyloctyl]-propylsulfides. Of those chosen, there are preferred relatively simply constructed organosilanes of formula I including bis-[3-trimethoxy-, -triethoxy-, and tripropoxysilylpropyl]-polysulfides namely the di-, tri- and tetrasulfides with 2, 3 or 4 sulfur atoms and their mixtures. Preferably these oligosulfidic silanes are used in an amount of 1 to 20 parts per 100 parts of silceous filler in the new elemental sulfur free rubber compositions.

Examples of compounds within the invention include 3,3'-bis(trimethoxysilylpropyl)disulfide, 3,3'-bis(triethoxysilylpropyl)tetrasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(-triethoxysilylpropyl)trisulfide, 3,3'-bis(tributoxysilylpropyl)disulfide, 3,3'-bis(trimethoxysilylpropyl)hexasulfide, 3,3'-bis(trioctoxysilylpropyl)tetrasulfide, 3,3'-bis(trihexoxysilylpropyl)disulfide, 3,3'-bis(tri-2'''-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(-tricyclohexoxysilylpropyl)tetrasulfide, 3,3'-bis(tricyclopentoxysilylpropyl)trisulfide, 2,2'-bis(tri-2''-methylcyclohexoxysilylethyl)tetrasulfide, bis(trimethoxysilylmethyl)tetrasulfide, 3-methoxy ethoxy propoxysilyl 3'-diethoxybutoxysilylpropyltetrasulfide, 2,2'-bis(dimethylmethoxysilylethyl)disulfide, 2,2'-bis(dimethyl soc.-butoxysilylethyl) trisulfide, 3,3'-bis(methyl butylethoxysilylpropyl)tetrasulfide, 3,3'-bis(di-t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-(diphenylcyclohexoxysilylpropyl)disulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl) disulfide, 3,3'-bis(butyl dimethoxysilylpropyl) trisulfide, 3,3'-bis(-phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 4,4'-bis(trimethoxysilylbuten-2-yl)tetrasulfide, 4,4'-bis(trimethoxysilylcyclohexylene)tetrasulfide, 5,5'-bis(dimethoxy methylsilylpentyl)trisulfide, 3,3'-bis(trimethoxysilyl-2-methylpropyl)-tetrasulfide, 3,3'-bis(dimethoxyphenylsilyl-2-methylpropyl)disulfide.

Unless otherwise indicated all parts and percentages are by weight.

It can be of special advantage if there are worked into the new rubber compositions one or more triazinesulfenimides of dicarboxylic acids or the new rubber compositions containing such sulfenimides. These triazinesulfenimides are disclosed in German Patent Application No. P 24 30 143.7 and related Schwarze U.S. Pat. Application Ser. No. 588,649 filed June 19, 1975 now U.S. Pat. No. 3,969,353, the entire disclosures of these two patent applications are hereby incorporated by reference and relied upon. These triazinesulfenimides include an imide of a dicarboxylic acid joined by a divalent sulfur atom once or twice to the triazine ring. Thus there can be used imides of dicarboxylic acids such as succinic acid, glutaric acid, phthalic acid, tetrahydrophthalic acid, etc., and their alkyl derivatives. This type of chemical compound includes for example 2-ethylamino-4-diethylamino-6-phthalimido-thiotriazine, 2-diethylamino-4,6-phthalimido-thiotriazine, 2-diethylamino-4,6-bis-(5,5-dimethyl-hydantoylthio)-triazine, 2-diethylamino-triazinyl-4,6-bis-thio-(3,5-dimethyl cyanurate), 2-diethylamino-4,6-bis-succinimidothiotriazine and also 2-dimethyl-amino-4,6-bis-succinimidothio-triazine.

These triazinesulfenimides are used in the new rubber compositions in amounts of 0.01 to 10 parts by weight based on 100 parts by weight of rubber.

Thus there are disclosed in said Schwarze application triazine sulphenimides of the formula

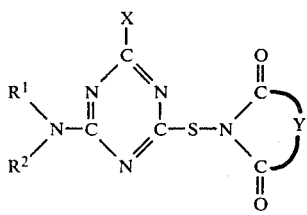

in which

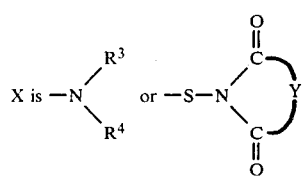

R¹, R², R³ and R⁴ are hydrogen or alkyl with 1 to 4 carbon atoms;

Y is —CH₂—CH₂—; —CH₂—CH₂—CH₂—; —CH(CH₃)—CH₂—;

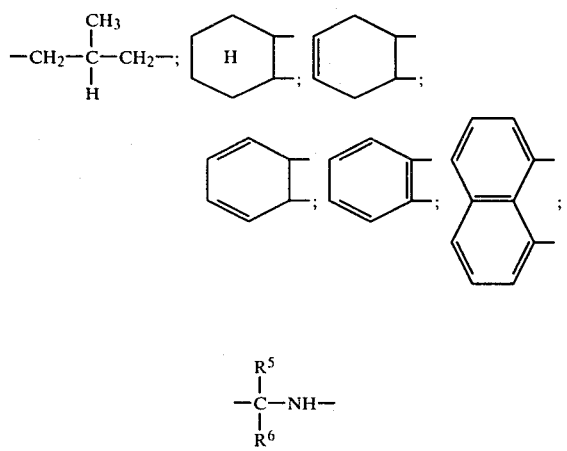

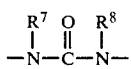

where R⁵ and R⁶ are hydrogen, alkyl with 1 to 8 carbon atoms, alkylthioalkyl with a total of 2 to 8 carbon atoms, CH₃—S—, alkoxyalkyl with a total of 2 to 8 carbon atoms, CH₃O— or phenyl, $$\begin{array}{c} R^7\ \ O\ \ R^8 \\ |\ \ \ ||\ \ \ | \\ -N-C-N- \end{array}$$

where R⁷ and R⁸ are hydrogen, alkyl with 1 to 8 carbon atoms, allyl or phenyl.

There can also be added with advantage in the rubber composition commercial vulcanization retarders, for example in an amount of 0.05 to 5 parts by weight based on 100 parts by weight of rubber. Such vulcanization retarders include for example banzoic acid, salicyclic acid, phthalic anhydride, N-nitrosodiphenylamine, N-cyclohexylthiophthalimide and also the retarders known in the literature.

If desired there can be premixed the described organosilane, the accelerator, as well as if desired other additives of the rubber composition or some other constituents or a constituent of this mixture, for example, the filler. It is not advantageous to hydrolyze the organosilane before insertion. The described organosilicon compounds, however, can be suitably mixed with a portion of the siliceous filler for easier dosaging and handling, whereby the usually liquid organosilane is converted into a powdery working product. It is also possible in a given case, but not with especial advantage to put the organosilane from its solution uniformly on the surface of the filler particles and to use if in this form. All three or only two of the procedures just described can also be combined.

In the production of rubber compositions frequently there is advantageously used the so-called "Upside-down process", which also is designated "Upside-down mixing". Thereby there is first added to the kneader for mixing the filler, then the assistants and last the rubber. Also there can be used other sequences that are customary.

Industrial fields of use for the described rubber mixtures for example are:

Industrial rubber articles such as cable insulation, hoses, driving belts, V-belts, conveyor belts, roller coating, vehicle tire treads, especially passenger car and truck-tire treads, as well as tire carcasses and tire sidewalls, cross country tires, shoe sole materials, packing rings, damping elements and many others. The new rubber compositions have also been tested for adhesive mixtures for solid joining of the rubber with reinforcing materials or reinforcing fillers, especially fibers, fiber fabrics and wires, for example of glass, metal (steel cords, zinc coated or brass-plated) and textile materials (polyamides, e.g., nylon or polyester fabrics, e.g., polyethylene terephthalate, and the like).

The filler Ultrasil VN2 is a precipitated active silica having a specific surface area (measured according to BET) of 130 m²/g and an average primary particle size of 28 nm.

The Ultrasil VN3 is likewise a precipitated active silica but has a specific surface area of 210 m²/g and an average primary particle size of 18 nm.

The rubber Buna CB10 is a polybutadiene rubber having a high cis-1,4-content.

Russ Corax 6 is a ISAF-active carbon black having a BET surface area of 120 m²/g, average particle size 21 millimicrons.

Without limiting the invention the results are given in the following individual recipes for the new rubber mixtures with test results on the vulcanizates and evaluations or comparisons of these results. Therein many different concepts are repeated so that abbreviations can be used.

| DEFINITIONS OF THE ABBREVIATIONS USED | | |
|---|---|---|
| Abbreviation | Designation | Measured In |
| ML 4 | Mooney plasticity at 100° C., standard rotor, testing time: 4 minutes | — |
| VT | Vulcanization temperature | °C. |
| ZF | Tensile strength | kp/cm² (kgf/cm²) |
| M 100 | Modulus at 100% | kp/cm² (kgf/cm²) |
| M 200 | Modulus at 200% | kp/cm² |
| M 300 | Modulus at 300% | kp/cm² |
| BD | Elongation at break | % |
| bl.D | Remaining elongation after break | % |

-continued
DEFINITIONS OF THE ABBREVIATIONS USED

| Abbreviation | Designation | Measured In |
|---|---|---|
| E | Rebound | % |
| EF | Resistance to tear propagation | kp/cm (kgf/cm) |
| SH | Shore-A-Hardness | — |
| A | Abrasion (also "DIN abrasion") | $mm^3$ |
| ΔT | Temperature increase (see Goodrich Flexometer) | °C. |

TESTING STANDARDS

The physical tests were carried out at room temperature according to the following standard specifications:

| (DIN = German industrial standards) | |
|---|---|
| Tensile strength, elongation at break and stretching value on 6mm large rings | DIN 53504 |
| Tear Propagation resistance | DIN 53507 |
| Rebound | DIN 53512 |
| Shore A hardness | DIN 53505 |
| Specific gravity | DIN 53550 |
| Mooney Test | DIN 53524 |
| Goodrich Flexometer (Determination of heat build-up, ΔT | ASTM D 623-62 |
| Abrasion | DIN 53516 |
| Determination of the compression set of the rubber | DIN 53517 |
| Fatigue test (according to DeMattia) | DIN 53522 |

The vulcanizates were always produced in a steam heated multiple die press at the stated vulcanization temperatures. The heating times (vulcanization times) are in each case the optimal heating times ascertained from the rheometer curves. In the examples the amounts of the constituents in the composition are given in parts by weight.

EXAMPLE I

Several rubber compositions having the following basic recipe were produced in conventional manner in a kneader at 80° C. flow temperature

| Constituent of Mixture | Amount in Weight % |
|---|---|
| Styrene-butadiene-rubber (SBR 1500, manufacture: Chemische Werke Huls A.G., Marl) | 100 |
| Finely divided highly active precipitated silica (Ultrasil VN3 of Degussa) | 50 |
| Stearic acid | 2 |
| Zinc oxide (active quality) | 4 |
| Bis-(3-triethoxysilylpropyl)-tetrasulfide | 10 |
| Accelerator (type and amount set forth below) | |

1. Accelerator: bis-(2-ethylamino-4-diethylamino-triazin-6-yl)-disulfide (Abbreviation: V143)
2. Accelerator: 2-[bis-(2-hydroxyethyl)-amino]-4,6-bis-mercaptotriazine (Abbreviation: V19)
3. Accelerator: tetramethylthiuram disulfide (Abbreviation: TMTD)

The vulcanization was carried out at 170° C.

TABLE 1

| Accelerator and Amount | ML 4 100° C. | ZF | M 200 | M 300 | BD | SH | E | A |
|---|---|---|---|---|---|---|---|---|
| 0.5 Part V 143 | 97 | 214 | 36 | 77 | 520 | 66 | 39 | 66 |
| 1.0 Part V 143 | 98 | 254 | 49 | 105 | 495 | 66 | 40 | 69 |
| 1.5 Part V 143 | 96 | 217 | 51 | 110 | 433 | 67 | 38 | 66 |
| 2.0 Part V 143 | 95 | 231 | 59 | 129 | 420 | 68 | 39 | 66 |
| 2.5 Part V 143 | 95 | 213 | 69 | 145 | 373 | 69 | 40 | 72 |
| 0.4 Part V 19 | 103 | 189 | 30 | 58 | 593 | 64 | 39 | 71 |
| 0.8 Part V 19 | 102 | 189 | 31 | 59 | 583 | 65 | 40 | 71 |
| 1.2 Part V 19 | 106 | 184 | 33 | 64 | 562 | 66 | 40 | 77 |
| 1.6 Part V 19 | 108 | 184 | 35 | 67 | 548 | 67 | 39 | 69 |
| 2.0 Part V 19 | 108 | 146 | 36 | 68 | 478 | 66 | 39 | 71 |
| 0.2 Part TMTD | 113 | 233 | 41 | 88 | 505 | 64 | 40 | 62 |
| 0.4 Part TMTD | 108 | 171 | 73 | 146 | 330 | 68 | 42 | 57 |
| 0.6 Part TMTD | 104 | 191 | 92 | 185 | 310 | 70 | 43 | 53 |
| 0.8 Part TMTD | 100 | 147 | 99 | — | 248 | 71 | 43 | 57 |
| 1.0 Part TMTD | 98 | 170 | 127 | — | 240 | 71 | 44 | 57 |

This investigation shows that the accelerator/silane ratio has considerable influence on the technical data for the rubber. Tetramethyl thiuramdisulfide is most effective in regard to the moduli. The disulfide V143 likewise produces outstanding data.

EXAMPLE II

Using the following base recipe further low filler styrene-butadiene rubber compositions were produced, their properties measured, cross-linked products produced therefrom at 170° C. and the properties of the cross-linked products also measured.

| Constituents of Composition | Amount |
|---|---|
| Styrene-butadiene rubber (SBR 1500) | 100 |
| Finely divided, highly active, precipitated silica (Ultrasil VN3) | 40 |
| Stearic acid | 2 |
| Zinc oxide (active) | 4 |
| Bis-(3-triethoxysilylpropyl)-tetrasulfide | 10 |
| Accelerators (diverse) | 1 |

TABLE 2

| | Accelerator Used | ML 4 | ZF | M 200 | M 300 | BD | SH | E | A |
|---|---|---|---|---|---|---|---|---|---|
| 4 | MBTS[1] | 64 | 240 | 51 | 91 | 520 | 69 | 41 | 78 |
| 5 | TMTD | 60 | 196 | 98 | 191 | 310 | 73 | 43 | 49 |
| 6 | TMTM[2] | 61 | 209 | 78 | 145 | 370 | 72 | 43 | 67 |
| 8 | Mixture of equal parts of MBTS and DPG[3] | 63 | 223 | 33 | 53 | 720 | 68 | 38 | 75 |
| 9 | Mixture of equal parts of CBS[4] and TMTM | 66 | 184 | 48 | 80 | 500 | 69 | 38 | 67 |

[1]MBTS = Di-2-benzothiazyldisulfide
[2]TMTM = Tetramethylthiurammonosulfide
[3]DPG = N,N'-Diphenylguanidine
[4]CBS = N-Cyclohexyl-2-benzothiazolsulfenamide In a test recipe based on styrene butadiene rubber using bis-(3-triethoxysilylpropyl)-tetrasulfide as the cross-linking agent there were tested various accelerators or accelerator combinations as constituents of the rubber composition. It was found that all accelerators contributed to the cross-linking of the rubber. They quantitatively influence the properties of the cross-linked product. Especially tetramethylthiuram monosulfide as well as the disulfide are very effective accelerators. Especially with the last named accelerators the use of silica as the filler in the cross-linked products was distinguished by a high level of data.

EXAMPLE III

Additional rubber mixtures based on natural rubber using the following base recipe were produced and tested

| Constituents of Composition | Amount |
|---|---|
| Natural rubber (SMR, standard Malaysian rubber with a maximum of 0.05% impurities) | 100 |
| Finely divided, highly active precipitated silica (Ultrasil VN3) | 50 |
| Stearic acid | 3 |
| Zinc oxide (so-called red seal quality) | 5 |
| Bis-(3-triethoxysilylpropyl)-tetrasulfide | 10 |
| Accelerators (diverse) | 1 |

The production of compositions 10 to 21 took place in conventional manner as in the preceding examples.

The cross-linking was carried out at 170° C. The test results are evident from following Table 3.

TABLE 3

| | Accelerator Used | ML 4 | ZF | M 200 | M 300 | BD | SH | E | A |
|---|---|---|---|---|---|---|---|---|---|
| 10 | MBT[1] | 42 | 182 | 31 | 69 | 508 | 62 | 41 | 143 |
| 11 | MBTS | 42 | 172 | 31 | 68 | 490 | 61 | 41 | 142 |
| 12 | TMTD | 43 | 196 | 44 | 99 | 445 | 60 | 48 | 99 |
| 13 | TMTM | 41 | 164 | 34 | 75 | 465 | 57 | 45 | 114 |
| 14 | ZDEC[2] | 42 | 157 | 39 | 87 | 413 | 59 | 47 | 116 |
| 15 | V 35[3] | 41 | 206 | 37 | 81 | 500 | 61 | 44 | 121 |
| 16 | V 143 | 41 | 216 | 37 | 81 | 513 | 63 | 43 | 120 |
| 17 | V 410[4] | 44 | 76 | 13 | 23 | 523 | 52 | 40 | — |
| 19 | DPG | 45 | 51 | 11 | 19 | 512 | 54 | 38 | — |
| 20 | CBZ | 45 | 195 | 35 | 75 | 503 | 61 | 42 | 125 |
| 21 | ETU[6] | 45 | 63 | 16 | 29 | 448 | 59 | 38 | — |

[1]MBT = 2-Mercaptobenzthiazole
[2]ZDEC = Zinc-N-diethyldithiocarbamate
[3]V 35 = 2-ethylamino-4-diethylamino-6-mercapto-s-triazine
[4]V 410 = 2-Dimethylamino-4,6-bis-dimethylamino-thio-triazine
[6]ETU = ethylenethiourea In this test recipe based on natural rubber there were again investigated various accelerators and their effect on the properties of the cross-linked products. It was found that all accelerators took part in the cross-linking and influenced the properties of the cross-linked product quantitatively. As was ascertained the preferred accelerators were disulfide, sulfenamide and especially tetramethylthiurammonosulfide as well as tetramethylthiuramdisulfide. The cross-linked product which was produced from the rubber composition with the tetrasulfidic silane and the accelerator TMTD was distinguished to a special degree.

EXAMPLE IV

To produce tire treads (tread strips) for passenger cars again there were produced several compositions with various vulcanization accelerators based on the following base recipe, the composition cross-linked and the properties of the original composition and of the cross-linked product measured.

| Constituents of Composition | Amount |
|---|---|
| Styrene-butadiene rubber, oil extended (SBR 1712; manufactured by Chemische Werke Huls AG in Marl) | 96.5 |
| Polybutadiene rubber with a high cis-1,4 content (BUNA CB 10) | 30.0 |
| Finely divided, highly active, precipitated silica (Ultrasil VN 2 of Degussa) | 75.0 |
| Zinc oxide (Red seal quality) | 4.0 |
| Stearic acid | 1.2 |
| Highly aromatic hydrocarbon plasticizer oil having a cold setting point of ± 0° C. | 12.0 |
| N-isopropyl-N'-phenyl-p-phenylenediamine | 1.5 |
| Phenyl-$\beta$-naphthylamine | 1.5 |
| Bis-(3-triethoxysilylpropyl)-tetrasulfide | 15.0 |
| Accelerators (diverse) | 1.0 |

The production of the composition took place with the help of the previously described Upside-down process.

From the various compositions there were then produced test plates 6 mm thick in a platen press.

The cross-linking was carried out at 170° C.

TABLE 4

| | Accelerator Used | ML 4 | ZF | M 200 | M 300 | BD | E | SH | A |
|---|---|---|---|---|---|---|---|---|---|
| 22 | MBT | 65 | 194 | 42 | 76 | 580 | 38 | 65 | 62 |
| 23 | MBTS | 49 | 186 | 41 | 73 | 555 | 38 | 65 | 59 |
| 24 | TMTD | 49 | 107 | 101 | — | 212 | 46 | 72 | 55 |
| 25 | TMTM | 50 | 153 | 79 | 143 | 318 | 43 | 70 | 56 |
| 26 | ZDEC | 54 | 148 | 82 | 140 | 315 | 43 | 70 | 56 |
| 27 | V 35 | 54 | 163 | 37 | 66 | 540 | 40 | 61 | 75 |
| 28 | V 143 | 50 | 106 | 39 | 69 | 403 | 39 | 61 | 75 |
| 29 | V 410 | 50 | 191 | 33 | 60 | 643 | 38 | 62 | 75 |
| 31 | DPG | 52 | 151 | 22 | 37 | 765 | 35 | 62 | 95 |
| 32 | CBS | 52 | 191 | 35 | 62 | 633 | 36 | 63 | 64 |
| 34 | BA[1] | 51 | 176 | 36 | 64 | 588 | 36 | 66 | 63 |
| 35 | HMT[2] | 51 | 174 | 33 | 58 | 623 | 35 | 66 | 67 |
| 36 | ETU | 52 | 176 | 28 | 48 | 715 | 35 | 64 | 76 |
| | Mixture of equal parts of TMTD and MBT | 55 | 113 | 85 | — | 243 | 40 | 69 | 51 |

[1]BA = Butyraldehydaniline
[2]HMT = Hexamethylentetramine

The effects of various accelerators were investigated here in a conventional tire tread composition for passenger cars wherein the tire tread composition did not contain elemental sulfur but had a tetrasulfidic silane added to the composition based on a polymer mixture of oil extended styrene-butadiene rubber and polybutadiene rubber with a high cis-1,4-content. The influence of the accelerators on the product cross-linked with the tetrasulfidic silane was similar or analogous to the results in Table 3 of Example III. An additional advantage of cross-linking with bis-(3-triethoxysilylpropyl)tetrasulfide is the essentially lower abrasion (as measured by DIN abrasion) of the tire strips of passenger car tires compared to that displayed by rubber compositions containing silica and vulcanized in conventional manner with sulfur.

EXAMPLE V

In an analogous manner there were produced rubber compositions of the following base recipe for the production of tire treads for trucks where again test plates were pressed at 170° C. and the properties of the cross-linked products determined.

| Constituents of Composition | Amount |
| --- | --- |
| Natural rubber (Ribbed smoked sheets I) | 70 |
| Polybutadiene rubber with a high cis-1,4 content (BUNA CB 10) | 30 |
| Finely divided, highly active precipitated silica (Ultrasil VN 2) | 55 |
| Zinc oxide (Red seal quality) | 4 |
| Stearic acid | 2.5 |
| Highly aromatic hydrocarbon plasticizer oil having a freezing point of ± 0° C. | 8 |
| Poly-2,2,4-trimethyl-1,2-dihydroquinoline | 1 |
| N-isopropyl-N'-phenyl-p-phenylenediamine | 2 |
| Bis-(triethoxysilylpropyl)-tetrasulfide | 10 |
| Ozone protective wax, paraffin based, freezing point 61–65° C. (Type G 35, manufactured by Luneburger Wachsbleiche GmbH, Luneburg) | 1 |
| Accelerators (diverse) | 1 |

TABLE 5

| | Accelerators Used | ML 4 | ZF | M 300 | BD | bl. D. | E | SH | A |
| --- | --- | --- | --- | --- | --- | --- | --- | --- | --- |
| 37 | MBT | 43 | 164 | 59 | 593 | 19 | 39 | 66 | 76 |
| 38 | MBTS | 41 | 160 | 64 | 555 | 17 | 40 | 66 | 84 |
| 39 | TMTD | 41 | 173 | 124 | 380 | 7 | 49 | 67 | 54 |
| 40 | TMTM | 40 | 167 | 106 | 410 | 7 | 47 | 66 | 55 |
| 41 | ZDEC | 43 | 176 | 95 | 463 | 9 | 45 | 64 | 53 |
| 42 | V 35 | 41 | 170 | 63 | 572 | 15 | 42 | 60 | 82 |
| 43 | V 143 | 39 | 146 | 64 | 517 | 14 | 42 | 59 | 79 |
| 44 | V 410 | 41 | 113 | 35 | 603 | 26 | 38 | 56 | 128 |
| 46 | DPG | 39 | 77 | 24 | 603 | 43 | 36 | 55 | 103 |
| 47 | CBZ | 40 | 170 | 61 | 597 | 21 | 42 | 60 | 67 |
| 48 | BA | 41 | 75 | 32 | 513 | 23 | 37 | 60 | 132 |
| 49 | HMT | 40 | 81 | 30 | 543 | 25 | 36 | 58 | 129 |
| 50 | ETU | 42 | 109 | 36 | 608 | 37 | 36 | 60 | 96 |
| 51 | Mixture of equal parts of TMTD and MBT | 42 | 175 | 108 | 423 | 8 | 47 | 65 | 57 |

Again there was tested similar to Example IV in a light rubber composition of the invention various accelerators, this time based on blends of natural and polybutadiene rubber for tread strips for truck tires cross-linked with a tetrasulfidic silane. There were found substantially the same results as in Example IV as shown in Table 4. Several accelerators showed in measuring the moduli and abrasion values especially favorable effects. The highly active precipitated silica (Ultrasil VN 2) used in the rubber composition had an average primary particle size of 28 millimicrons, a surface area measured by BET of 130 m²/g and an SiO₂ content of 87 weight percent.

EXAMPLE VI

The following rubber compositions 52 to 55 based on blends from natural rubber and polybutadiene rubber (ratio 70:30) with various amounts of silane were compared with a conventional carbon black (in place of silica) and sulfur containing composition without silane.

| Constituents of Composition | Comparison Composition | 52 | 53 | 54 | 55 |
| --- | --- | --- | --- | --- | --- |
| | | (Composition No. & Amount) | | | |
| Natural rubber (Ribbed Smoked Sheets I with a Defo-hardness of 800) | 70 | 70 | 70 | 70 | 70 |
| Polybutadiene rubber with high cis-1,4-content (BUNA CB 10) | 30 | 30 | 30 | 30 | 30 |
| ISAF-carbon black (CORAX$^R$ 6 of DEGUSSA) | 55 | — | — | — | — |
| Finely divided, precipitated silica (ULTRASIL VN 2) | — | 55 | 55 | 55 | 55 |
| Bis (3-triethoxysilyl-propyl)-tetrasulfide | — | 5 | 7.5 | 10 | 12.5 |
| Zinc oxide | 4 | 4 | 4 | 4 | 4 |
| Stearic acid | 2.5 | 2.5 | 2.5 | 2.5 | 2.5 |
| Poly-2,2,4-trimethyl-1,2-dihydroquinoline | 1 | 1 | 1 | 1 | 1 |
| N-Isopropyl-N'-phenyl-p-phenylendiamine | 2 | 2 | 2 | 2 | 2 |
| Ozone protective wax according to Example V | 1 | 1 | 1 | 1 | 1 |
| Highly aromatic hydrocarbon plasticizer oil having a cold setting point of ± 0° C. | 8 | 8 | 8 | 8 | 8 |
| Benzothiazyl-N-sulfenmorpholide | 1 | 2 | 2 | 2 | 2 |
| Sulfur | 1.5 | — | — | — | — |

The rubber compositions had the following viscosities (plasticities)

TABLE 6a

| Composition No. | ML 4 (100° C.) |
| --- | --- |
| 52 | 60 |
| 53 | 61 |
| 54 | 56 |
| 55 | 55 |
| Comparison Composition | 70 |

With increasing addition of silane the viscosity of the rubber composition is reduced which is an important advantage in industrial operation.

There were pressed in a heatable multiple plunger press plates 6 mm thick from each of the five compositions at a cross-linking temperature of 165° C. in the usual manner and then the properties of the cross-linked product measured.

TABLE 6b

| Composition No. | ZF | M 300 | BD | E | SH | A |
| --- | --- | --- | --- | --- | --- | --- |
| 52 | 171 | 51 | 637 | 42 | 54 | 95 |
| 53 | 198 | 79 | 573 | 42 | 63 | 59 |
| 54 | 202 | 103 | 492 | 44 | 66 | 49 |
| 55 | 200 | 116 | 453 | 47 | 68 | 52 |
| Comparison Composition | 211 | 85 | 555 | 38 | 61 | 53 |

The comparison composition is a typical tread strip composition for truck tires which was referred to for comparison with the compositions of the invention for the same purpose. It was found in this investigation that already composition 54, viewed as a whole, reaches the level of data of the comparison composition while composition 55 with the highest silane content on the one hand clearly exceeded the comparison composition (Modulus 300 and elasticity) and on the other hand also attained the favorable abrasion values.

EXAMPLE VII

In further examples of rubber compositions according to the invention there were varied the silanes used. The base mixture had the following compositions

| Constituents of Composition | Amount |
|---|---|
| Styrene-butadiene rubber (SBR 1500) | 100 |
| Finely divided, precipitated silica (Ultrasil VN3) | 50 |
| Stearic acid | 2 |
| Zinc oxide (active, pure) | 4 |
| Silane (diverse) | 10 |
| Tetramethylthiuramdisulfide | 1 |

56 As the silane: Bis-(3-triethoxysilylpropyl)-tetrasulfide
57 As the silane: Bis-(3-trimethoxysilylpropyl)-trisulfide
58 As the silane: Bis-(3-trimethoxysilylpropyl)-disulfide.

The properties of the rubber compositions produced in conventional manner and of the cross-linked products produced therefrom at 170° C. can be seen in following Table 7.

TABLE 7

| Composition No. | VZ | ML 4 | ZF | M300 | BD | E | SH |
|---|---|---|---|---|---|---|---|
| 56 | 20 | 73 | 197 | 187 | 313 | 41 | 76 |
| 57 | 20 | — | 183 | 145 | 353 | 40 | 80 |
| 58 | 20 | 79 | 231 | 83 | 570 | 41 | 74 |

It was demonstrated in a styrene-butadiene rubber containing test recipe that various of the polysulfidic silanes added according to the invention are effective, even if these are added in equal amounts by weight, which in the specified series means a decreasing sulfur content.

EXAMPLE VIII

Two further sulfur containing compositions according to the invention (59 and 60) based on a blend of styrene-butadiene and polybutadiene rubber, relatively high filler and plasticizer oil contents for tire treads (tread strips) of passenger car tires as well as their vulcanizates were compared with a conventional rubber composition, which in place of silica and silane contained carbon black and sulfur. The two compositions 59 and 60 of the invention differed essentially in the use of different fillers.

| Constituents of Composition | Amount | | |
|---|---|---|---|
| | Composition No. 59 | Composition No. 60 | Comparison Composition |
| Styrene-butadiene rubber (SBR 1500) | 70 | 70 | 70 |
| Polybutadiene rubber with high cis 1,4 content (BUNA CB 10) | 30 | 30 | 30 |
| ISAF carbon black (CORAX 6) | — | — | 75 |
| Finely divided, precipitated silica (Ultrasil VN2) | 75 | — | — |
| Pyrogenically produced pure silica (Aerosil 130 of Degussa) | — | 75 | — |
| Zinc oxide (active) | 4 | 4 | 4 |
| Stearic acid | 1.2 | 1.2 | 1.2 |
| Naphthenic hydrocarbon plasticizer oil of cold setting point −28° C. | 38.5 | 38.5 | 38.5 |
| Phenyl-β-naphthylamine | 1.5 | 1.5 | 1.5 |
| N-isopropyl-N'-phenyl-p-phenylenediamine | 1.5 | 1.5 | 1.5 |
| Bis-(3-triethoxysilylpropyl)-tetrasulfide | 15 | 14 | — |
| N-cyclohexyl-2-benzothiazole-sulfenamide | 2.0 | 2.0 | 1.2 |
| Sulfur | — | — | 1.6 |

The measured properties of the compositions and their cross-linked products are presented in following Table 8.

TABLE 8

| | Composition No. 59 | Composition No. 60 | Comparison Composition |
|---|---|---|---|
| ML 4 (100° C.) | 39 | 36 | 50 |
| VT | 165° C. | 170° C. | 165° C. |
| ZF | 140 | 161 | 143 |
| M 300 | 74 | 70 | 52 |
| BD | 465 | 550 | 602 |
| E | 39 | 33 | 26 |
| SH | 65 | 68 | 56 |
| A | 69 | 47 | 79 |
| ΔT | 63 | 62 | 133 |

The figures in Table 8 show the superiority of the rubber compositions of the invention over the comparison composition. Thus the rubber composition of the invention has a substantially lower Mooney viscosity (ML 4). The cross-linked products produced therefrom have a higher tensile strength, higher moduli (M 300), better rebound and a higher abrasion resistance (lower abrasion A) and advantageously a much lower temperature increase (ΔT).

On this basis passenger car tires were produced with tread strips of composition 59 and of the comparison composition and these tires tested in street tests and on ice. There were found almost identical street abrasion properties (6000 km for each travelled 50% autobahn and 50% federal streets in both directions) and a clearly better ice-skid resistant property of the tires (tread strips) for composition 59 of the invention. Thus for example for the circuit test on the ice track for tires made of composition 59 there was found a value of 118 in contrast to the value of 105% for the tires of the comparison composition, both based on the standard tire of an equally high ISAF carbon black filled, sulfur vulcanized rubber composition based on an oil extended styrene-butadiene and polybutadiene rubber with a defined comparison value of 100%.

EXAMPLE IX

The following two compositions 61 and 62 of the invention based on blending of styrene-butadiene and polybutadiene rubber containing as the cross-linking system a tetrasulfidic silane and tetramethylthiuramdisulfide as well as on the one hand a silica filler (No. 61) and on the other hand a blend of carbon black and silica (No. 62) were compared with a conventional, but as nearly as possible the same composition, rubber composition which contained only carbon black as filler and contained a conventional elemental sulfur vulcanizing system.

| Constituents of Composition | Amount | | |
|---|---|---|---|
| | Composition No. 61 | Composition No. 62 | Comparison Composition |
| Oil extended styrene-butadiene rubber (SBR 1712) | 96.5 | 96.5 | 96.5 |
| Polybutadiene rubber with high cis-1,4-content (BUNA CB 10) | 30 | 30 | 30 |
| ISAF-carbon black (BET-surface area 120m²/g. Average particle size 21 millimicron (CORAX 6) | — | 37.5 | 75 |
| Active, precipitated silica (ULTRASIL VN 2) | 75 | 37.5 | — |
| Zinc oxide, pure | 4 | 4 | 4 |
| Stearic acid | 1.2 | 1.2 | 1.2 |
| Plasticizer oil, highly aromatic hydrocarbon, cold setting point ± 0° C. | 12 | 12 | 12 |
| Phenyl-β-naphthylamine | 1.5 | 1.5 | 1.5 |
| N-Isopropyl-N'-phenyl-p-phenylendiamine | 1.5 | 1.5 | 1.5 |
| Bis-(3-triethoxysilyl-propyl)-tetrasulfide | 7 | 3.5 | — |
| N-tert.-butyl-2-benzthiazylsulfenamide | — | — | 1.2 |
| Tetramethylthiuram-disulfide | 0.5 | 0.5 | — |
| 2-Diethylamino-4,6-bis-phthalimido-thiotriazine | 2 | 2 | — |
| Sulfur | — | — | 1.6 |

The compositions and their cross-linked products showed the following properties (vulcanization at 165° C.)

TABLE 9a

| | Composition No. 61 | Composition No. 62 | Comparison Composition |
|---|---|---|---|
| ML 4 | 68 | 70 | 71 |
| $D_\infty - D_a$[1] | 0.578 | 0.598 | 0.570 |
| Reversion[2] | none | none | 17 |
| ZF | 210 | 184 | 177 |
| M 200 | 34 | 40 | 34 |
| M 300 | 63 | 75 | 69 |
| BD | 600 | 550 | 570 |
| E | 34 | 31 | 29 |
| SH | 59 | 61 | 60 |
| A | 68 | 69 | 60 |
| ΔT | 85 | 77 | 136 |
| Remaining deformation (in %) | — | 5.0 | 19.7 |

[1]Torque difference (a measure of the extent of cross-linking measured with the Rheometer at 165° C. in mkp)
[2]Decrease in the extent of cross-linking $D_\infty - D_a$ one hour after reaching the maximum Both compositions 61 and 62 of the invention contained a relatively small portion of a triazine sulfenimide of a dicarboxylic acid which has the advantage of reducing the amount of oligosulfidic silane without deteriorating the total technical properties of the rubber. In contrast to the comparison composition, the rubber compositions of the invention and their cross-linked products had higher moduli, higher tensile strength, better rebound, better temperature increase properties (i.e., lower ΔT) and lower residual deformation (Flexometer testing).

Composition 62 of the invention which contains as filler a mixture of carbon black and silica produces further important advantages. In contrast to the comparison composition and its vulcanizate composition 62 exhibits clearly better technical properties for the rubber (Tables 9a and 9b) and especially better aging properties for the cross-linked product (Table 9c).

TABLE 9b

| | Composition No. 62 | Comparison Composition |
|---|---|---|
| Compression Set B. 70 hours/100° C. in % | 43.0 | 47.7 |
| Flexometer testing: | | |
| Static deformation in % | 5.1 | 8.4 |
| Dynamic deformation in % | 8.4 | 24 |
| Remaining deformation in % | 5.0 | 19.7 |
| De-Mattia testing Tear growth measured in kilocycles | | |
| 2 to 4 mm | 0.83 | 0.74 |
| 4 to 8 mm | 3.20 | 2.30 |
| 8 to 12 mm | 6.95 | 4.64 |
| break at | 48.9 | 28.5 |

The testings with the Goodrich Flexometer were carried out with a stroke of 0.25 inch, at a frequency of 30 Hz, a specific load of 11 kg, at room temperature and a running time of 25 minutes.

The bend test (permanent bend test according to DeMattia) on the tear growth of 2 to 4 mm etc., is described in the DIN Norm 53522 page 3 and corresponds to ASTM D813/1965 or Draft ISO-Recommendation No. 173.

After aging in a hot air cabinet for 3 days at 100° C. the following values were obtained.

TABLE 9c

| | Composition No. 62 | Comparison Composition |
|---|---|---|
| ZF | 176 | 149 |
| M 200 | 47 | 81 |
| M 300 | 85 | 135 |
| BD | 543 | 332 |
| SH | 62 | 70 |
| A | 97 | 98 |

The superiority of the aged cross-linked product of the composition of the invention over the comparison composition is clearly visible from the figures in Table 9c. These facts illustrate a surprising and valuable technical effect.

In the testing on the ice track there resulted with tires of tread strip composition 62 in the circuit test a value of 131% compared to the standard tires whose measured results again were taken as 100%; in the braking test a value of 118% was found in regard to the carrying out of these tests, see Example XI.

EXAMPLE X

The following composition 63 of the invention is especially suited for the production of tread strips (treads) for truck tires and is again compared with an analogous rubber composition with the same high filler content according to the state of the art.

| Constituents of Composition | Amount | |
|---|---|---|
| | Composition No. 63 | Comparison Composition |
| Natural rubber (RSS 1, Defo 800) | 70 | 70 |
| Polybutadiene rubber with a high cis-1,4 content (BUNA CB 10) | 30 | 30 |
| ISAF carbon black (Corax 6) | 27.5 | 55 |

-continued

| Constituents of Composition | Amount | |
|---|---|---|
| | Composition No. 63 | Comparison Composition |
| Active, precipitated silica (Ultrasil VN 3) with a BET-surface area of 210 m²/g and an average primary particle size of 18 millimicron | 27.5 | — |
| Stearic acid | 2 | 2 |
| Zinc oxide | 5 | 5 |
| Highly aromatic hydrocarbon plasticizer oil having a cold setting point of 0° C. | 8 | 8 |
| Phenyl-β-naphthylamine | 1 | 1 |
| Phenyl-α-naphthylamine | 0.5 | 0.5 |
| N-Isopropyl-N'-phenyl-p-phenylendiamine | 0.8 | 0.8 |
| Bis-(3-triethoxysilyl-propyl)-tetrasulfide | 3 | — |
| Benzothiazole-2-sulfenmorpholide | — | 1 |
| Tetramethylthiuramdisulfide | 0.6 | — |
| 2-diethylamino-4,6-bis-phthalimido-thiotriazine | 3 | — |
| Sulfur | — | 1.5 |

The Mooney viscosity (100° C.) of composition 63 was determined as 76 and of the comparison composition as 77.

The cross-linking took place at 145° C. The properties of the cross-linked product (unaged as well as after the aging process) are taken from the following table.

TABLE 10a

| | Composition No. 63 | | Comparison Composition | |
|---|---|---|---|---|
| | Unaged | After aging 3 days at 100° C. | Unaged | After aging 3 days at 100° C. |
| ZF | 184 | 143 | 226 | 118 |
| M 100 | 20 | 22 | 21 | 36 |
| M 200 | 55 | 60 | 58 | 96 |
| M 300 | 104 | 112 | 109 | not determinable |
| BD | 450 | 363 | 528 | 240 |
| E | 49 | 48 | 43 | 44 |
| SH | 64 | 65 | 65 | 71 |

The determination of the compression set, the testing in the Goodrich Flexometer (analogous to Example IV) and the DeMattia testing of the tear propagation (with incision) gave the following values.

TABLE 10b

| Type of Test | Composition No. 63 | Comparison Composition |
|---|---|---|
| Goodrich Flexometer tests | | |
| Temperature increase | 65 | 79 |
| Static deformation | 3.8 | 1.6 |
| Dynamic deformation | 8.7 | 18.3 |
| Remaining deformation | 5.6 | 11.3 |
| DeMattia test (in kilocycles) | | |
| 2 to 4 mm | 14.8 | 1.8 |
| 4 to 8 mm | 65.7 | 2.6 |
| 8 to 12 mm | 150.9 | 4.8 |

From the measured values of tables 10a and 10b there can be very clearly recognized the technical superiority of the cross-linked products of composition No. 63 of the invention compared to the comparison composition. The clearly better values for the dynamic properties (Goodrich Flexometer tests) are prominent. Thus the temperature increase (heat build up) in about 14° C. lower; furthermore there can be seen the much better values which result from the DeMattia test. At the same values for the moduli and the Shore hardness the concerning values for the cross-linked products from the composition of the invention are many times higher (i.e., more favorable).

The hot air aging likewise demonstrates the clear superiority of the compositions of the invention, in which for example the Shore hardness for the cross-linked products from the composition of the invention only increases one point through the aging while the comparison composition leads to an increase of six points in the Shore hardness. Furthermore, both the tensile strength and the elongation at break decrease to a significantly lesser extent as a result of the aging.

EXAMPLE XI

In the following two rubber compositions No. 64 and No. 65 according to the invention without elemental sulfur were cross-linked with the new cross-linking agent combination and compared with two rubber compositions vulcanized in the conventional manner. The cross-linking of the new rubber composition is hereby caused by a new combination of an oligosulfidic silane, a thiuram accelerator and a triazinesulfenimide of a dicarboxylic acid in the presence of a silica filler.

| Constituents of Composition | Compositions | | | |
|---|---|---|---|---|
| | No. 64 | Comparison | No. 65 | Comparison |
| Oil extended styrene-butadiene rubber, (SBR 1778) manufactured by Chem. Werke Huls AG in Marl | 68.8 | 68.8 | — | — |
| Oil extended styrene butadiene rubber (SBR 1712) | — | — | 68.8 | 68.8 |
| Polybutadiene-rubber (BUNA CB 10) | 50 | 50 | 50 | 50 |
| Active, precipitated silica (Ultrasil VN 2) | 114 | 114 | 114 | 114 |
| Bis-(3-triethoxy-silylpropyl)-tetrasulfide | 6 | 6 | 8 | 8 |
| Zinc oxide | 3 | 3 | 3 | 3 |
| Stearic acid | 1 | 1 | 1 | 1 |
| Naphthenic hydrocarbon plasticizer oil (setting point −28° C.) | 50.2 | 50.2 | — | — |
| Highly aromatic hydrocarbon plasticizer oil (setting point ±0° C.) | — | — | 50.2 | 50.2 |
| Phenyl-β-naphthylamine | 1.2 | 1.2 | 1.2 | 1.2 |
| N-Isopropyl-N'-phenyl-p-phenylendiamine | 1.2 | 1.2 | 1.2 | 1.2 |
| N-Cyclohexyl-2-benzothiazole-sulfenamide | — | 1.2 | — | 1.2 |
| Diphenylguanidine | — | 2.8 | — | 2.8 |
| Tetramethylthiuram-monosulfide | 1.2 | 0.1 | — | 0.1 |
| Tetramethylthiuram-disulfide | 1.2 | — | 1.2 | — |
| 2-Diethylamino-4,6-bis-phthalimido-thiotriazine | 2 | — | 2 | — |
| Sulfur | — | 2 | — | 2 |

For these rubber compositions and their cross-linked products the various tests gave the following values TABLE 11a

|  | Compositions | | | |
|---|---|---|---|---|
|  | No. 64 | Comparison | No. 65 | Comparison |
| Rheometer test |  |  |  |  |
| (165° C.): $D_\infty - D_a$ | 0.418 | 0.662 | 0.432 | 0.739 |
| ML 4 | 78 | 54 | 85 | 59 |
| After cross-linking at 165° C.; 15 minutes |  |  |  |  |
| ZF | 104 | 125 | 140 | 150 |
| M 200 | 33 | 35 | 33 | 32 |
| M 300 | 54 | 60 | 54 | 55 |
| BD | 510 | 520 | 610 | 622 |
| E | 32 | 31 | 35 | 31 |
| SH | 66 | 67 | 67 | 68 |
| A | 75 | 89 | 72 | 100 |
| Test results with the Goodrich Flexometer (conditions the same as in Example IX) |  |  |  |  |
| ΔT | 69 | 79 | 70 | 79 |
| Static Compression | 10.1 | 12.2 | 9.0 | 10.7 |
| Dynamic Compression | 23.2 | 22.9 | 18.9 | 22.1 |
| Remaining deformation | 11.0 | 18.7 | 11.5 | 19.9 |

Although differences are discernible between the measured values for compositions 64 and 65 of the invention and their cross-linked products and the measured values for the comparison compositions and their vulcanization products which according to the state of the art were vulcanized with sulfur and vulcanization accelerators in the presence of a oligosulfidic silane, yet in observing the whole of the measured properties there is a certain conformity amongst the properties of the comparable rubber compositions. Significant differences however come to light after the aging of the cross-linked products whereby the cross-linked products from the rubber compositions of the invention exhibit clearly better properties with similar results to those in Example X. (See Table 10).

There were produced from the four rubber compositions tread strips and with these tread strips tires for passenger cars. All of these tires were examined in an extensive practical test on their suitability for winter tires. Especially the skid properties of the tires on ice as well as on wet asphalt streets were investigated and measured.

The test took place with the same passenger cars. The tire compositions all had the same profile. The first test took place on a circular ice track having a 20 meter effective diameter (closed circular breakaway test; time for each of six measured rounds (t) wherein the last three were evaluated). The measured value is the slip coefficient $\mu_k$, calculated by the formula $\mu_k = (4\pi^2 r/g \cdot t^2)$.

Secondly there were carried out in braking tests at a starting speed of 20 km/h complete stopping tests on the ice track.

The measured value is the slip coefficient $\mu_B = \bar{b}/g$. ($\bar{b}$ = average braking acceleration in meters/sec$^2$, g = ground acceleration = 9.81 meters/sec$^2$). The artificial ice had a temperature on the surface of $-5°$ C. The air temperature at a height of 0.8 meter over the ice upper surface amounted to $+2°$ to $+4°$ C.

The examination of the tires on a wet track took place on an asphalt covered street sprayed with water. In the braking tests on this watered track there were employed starting speeds of 50, 70 and 90 km/h and then complete stopping measurements carried out. The stopping distance was measured in meters, the average delay determined and from this the coefficient of friction $\mu$ calculated.

Before and after the driving tests there were carried out in each case comparison tests with standard tires which had the same profile as the tested new tires. Therewith it was guaranteed that under otherwise equal conditions reliable comparison values were measured. The average values were measured. The average values measured with the standard tires were fixed as 100%.

From the measured coefficient of friction the following values were obtained.

TABLE 11b

| Type of Test | Composition No. 64 | Comparison Composition | Composition No. 65 | Comparison Composition |
|---|---|---|---|---|
| 1. Skid properties on ice ($-4°$ C.) |  |  |  |  |
| 1.1 circular test $\mu_k =$ | 0.112 | 0.099 | 0.092 | 0.088 |
| 1.2 circular test compared to Standard tires (= 100%) | 145% | 129% | 120% | 115% |
| 1.3 Braking test $\mu_B =$ | 0.085 | 0.078 | 0.080 | 0.076 |
| 1.4 Braking test compared to Standard-tires (= 100%) | 130% | 122% | 124% | 117% |
| 2. Skid properties on wet asphalt streets at starting speeds of |  |  |  |  |
| 2.1 50 km/h $\mu =$ | 0.310 | 0.288 | 0.341 | 0.338 |
| compared to Standard tires (= 100%) | 101% | 94% | 111% | 110% |
| 2.2 70 km/h $\mu =$ | 0.265 | 0.276 | 0.282 | 0.274 |
| compared to Standard tires (= 100%) | 93% | 97% | 99% | 96% |
| 2.3 90 km/h $\mu =$ | 0.253 | 0.238 | 0.261 | 0.252 |
| compared to Standard tires (= 100%) | 94% | 88% | 97% | 94% |

The percent values from this table again result from the comparison with the standard tires (= 100%). Hereto reference is made to Example VIII.

EXAMPLE XII

Two further rubber compositions which contained as filler a blend of a precipitated silica and an ISAF carbon black and which in the first part of the example were compared with a composition according to the state of the art which contained the same silica filler and silane showed unexpectedly outstanding technical effects.

| Constituents of Composition | Composition Nos. | | Comparison Composition |
|---|---|---|---|
| | 66 | 67 | |
| Oil extended styrene-butadiene rubber (SBR 1778) | 68.8 | 68.8 | 68.8 |
| Polybutadiene rubber (Buna CB 10) | 50 | 50 | 50 |
| ISAF carbon black (Corax 6) | 57 | 38 | — |
| Active, precipitated silica (Ultrasil VN 2) | 57 | 76 | 114 |
| Bis-(3-triethoxy-silylpropyl)-tetrasulfide | 4 | 6 | 6 |
| Zinc oxide | 3 | 3 | 3 |
| Stearic acid | 1 | 1 | 1 |
| Naphthenic hydrocarbon plasticize oil (setting point −28° C.) | 50.2 | 50.2 | 50.2 |
| Phenyl-β-naphthyl-amine | 1.2 | 1.2 | 1.2 |
| N-Isopropyl-N'-phenyl-p-phenylendiamine | 1.2 | 1.2 | 1.2 |
| N-Cyclohexyl-2-benzothiazolsulfenamide | — | — | 1.2 |
| Tetramethylthiuram-monosulfide | — | — | 0.1 |
| Diphenylguanidine | — | — | 2.8 |
| Tetramethyl-thiuramdisulfide | 0.8 | 0.8 | — |
| 2-Diethylamino-4,6-bis-phthalimido-thiotriazine | 2 | 2 | — |
| Bis-(2-ethylamino-4-diethyl-amino-triazin-6-yl)-disulfide | 1 | 1 | — |
| Sulfur | — | — | 2 |

The various tests gave the following values for these rubber compositions and their cross-linked products.

TABLE 12a

| | Composition Nos. | | Comparison Composition |
|---|---|---|---|
| | 66 | 67 | |
| ML 4 | 64 | 66 | 54 |
| After cross-linking at 165° C. | | | |
| ZF | 102 | 105 | 132 |
| M 100 | 15 | 18 | 17 |
| M 200 | 32 | 36 | 35 |
| M 300 | 56 | 61 | 61 |
| BD | 475 | 465 | 528 |
| E | 24 | 27 | 30 |
| SH | 62 | 66 | 67 |

After the accomplished aging of the cross-linked products of 3 days at 100° C. in the hot air oven there resulted the following values.

TABLE 12b

| | Composition Nos. | | Comparison Composition |
|---|---|---|---|
| | 66 | 67 | |
| ZF | 91 | 102 | 93 |
| M 100 | 19 | 21 | 35 |
| M 200 | 40 | 46 | 82 |
| M 300 | 68 | 76 | not determinable |
| BD | 390 | 390 | 220 |
| E | 25 | 28 | 33 |

TABLE 12b-continued

| | Composition Nos. | | Comparison Composition |
|---|---|---|---|
| | 66 | 67 | |
| SH | 62 | 65 | 79 |

After aging for 7 days at 100° C. carried out in the same manner there were measured better values for the compositions of the invention than for the comparison composition according to Table 12b, that is after aging for only three days.

For the cross-linked products from composition Nos. 66 and 67 of the invention there resulted for example after the named aging of seven days elongation at break of 315%, moduli (300% elongation) of 81 respectively, 90 kp/cm² and Shore hardnesses of 66 respectively 69.

In consideration of the level of the whole of all of the data for composition nos. 66 and 67 of the invention especially involving the aging process, the statement can be made that previously none of the known rubber compositions permitted the reaching of this quality level. This shows especially clearly in the following measured values for the skid resistance on the ice track and wet streets of winter tires which had tread strips of the two rubber compositions of the invention.

In analogous tests to those in Example XI described before Table 11b there resulted the following measured values.

TABLE 12c

| Type of Test | Composition Nos. | |
|---|---|---|
| | 66 | 67 |
| 1. Skid properties on ice (−5° C.) | | |
| 1.1 Circular test compared to standard tires (= 100%) | 189% | 185% |
| 1.2 Braking test compound to standard tires (= 100%) | 136% | 134% |
| 2. Skid properties on streets sprayed with water | | |
| 2.1 With an asphalt coating at starting speeds of | | |
| 50km/h | 104% | 103% |
| 70km/h | 102% | 96% |
| 90km/h | 98% | 92% |
| 2.2 With a concrete coating at starting speeds of | | |
| 50km/h | 108% | 100% |
| 70km/h | 98% | 98% |
| 90km/h | 94% | 96% |

The standard or comparison tires had tread strips of the comparison composition according to Example IX and the same profile as the tested tires from composition nos. 66 and 67. The comparison tests took place before and after the tests with the new tires, also under practically the same conditions.

Comparison with the winter tires of composition nos. 64 and 65 likewise tested on the ice track and wet streets showed that the winter tires from composition nos. 66 and 67 had still better values, especially in the test on the ice track.

The compositions can comprise, consist essentially of or consist of the stated materials but must be free of elemental sulfur.

We claim:

1. An elemental sulfur free cross-linkable rubber composition comprising a rubber capable of being cross-linked by sulfur, a siliceous filler in an amount of 1 to 300 parts per 100 parts by weight of the rubber, carbon black in an amount of 0 to 300 parts by 100 parts by weight of the rubber, the total of siliceous filler and carbon black not exceeding about 300 parts per 100 parts by weight of the rubber, a vulcanization accelerator for a sulfur cross-linkable rubber in an amount of 0.02 to 10 parts per 100 parts by weight of the rubber and a sulfur containing organosilicon compound having the formula:

$$Z-Alk-S_x-Alk-Z$$

in which Z is:

$$-S\begin{array}{c}R_1\\R_2\end{array}, \quad -Si\begin{array}{c}R_1\\R_2\\R_2\end{array}, \quad -Si\begin{array}{c}R_2\\R_2\\R_2\end{array} \text{ or } -Si\begin{array}{c}OC_2H_4\\OC_2H_4\\OC_2H_4\end{array}N$$

(1)     (2)     (3)     (4)

where $R_1$ is alkyl of 1 to 4 carbon atoms, cycloaklyl of 5 to 8 carbon atoms or phenyl, $R_2$ is alkoxy of 1 to 4 carbon atoms, cycloalkoxy of 5 to 8 carbon atoms or phenoxy, Alk is a divalent aliphatic hydrocarbon or a cyclic hydrocarbon group containing 1 to 8 carbon atoms and x is a number from 2 to 6 in an amount of 0.2 to 40 parts per 100 parts of siliceous filler, said sulfur containing organosilane compound being the sole vulcanizing agent.

2. The composition of claim 1 wherein the siliceous filler is silica.

3. The composition of claim 2 wherein the siliceous filler is finely divided precipitated silica or pyrogenic silica.

4. The composition of claim 1 wherein Z is (1), (2) or (3).

5. The composition of claim 1 where n is 2 to 4.

6. The composition of claim 5 where n is 3 to 4.

7. The composition of claim 1 where Alk is a saturated aliphatic hydrocarbon of 1 to 8 carbon atoms.

8. The composition of claim 7 where alk has 2 to 3 carbon atoms.

9. The composition of claim 8 wherein Z is (3).

10. The composition of claim 9 wherein all $R_2$ groups are ethoxy.

11. The composition of claim 1 wherein there are 10 to 150 parts of siliceous filler per 100 parts of rubber and 1 to 20 parts of organosilicon compound per 100 parts of siliceous filler.

12. The composition of claim 1 wherein the polymer is a polymer of a conjugated diene.

13. The composition of claim 12 wherein the polymer is natural rubber, polybutadiene, polyisoprene, butadienestyrene copolymer, butadiene-acrylonitrile copolymer, polychlorobutadiene, butyl rubber, chlorobutyl rubber, bromobutyl rubber or ethylene-propylene non-conjugated polyene terpolymer.

14. The composition of claim 13 wherein the polymer is natural rubber, polybutadiene or butadienestyrene copolymer.

15. The composition of claim 14 where Z is (3), x is 2 to 4 and Alk is 2 to 3.

16. The composition of claim 15 where $R_2$ is ethoxy.

17. The composition of claim 1 including 0.01 to 10 parts per 100 parts by weight of the rubber of a triazine sulphenimide of the formula

[structure: triazine ring with substituents X, $R^1$, $R^2$ via N–C linkages, and C–S–N(C=O)$_2$Y group]

in which $$X \text{ is } -N\begin{array}{c}R^3\\R^4\end{array} \text{ or } -S-N\begin{array}{c}C=O\\C=O\end{array}Y$$

$R^1$, $R^2$, $R^3$ and $R^4$ are hydrogen or alkyl with 1 to 4 carbon atoms;

Y is $-CH_2-CH_2-$; $-CH_2-CH_2-CH_2-$; $-CH(CH_3)-CH_2-$;

$$-CH_2-\underset{\underset{H}{|}}{\overset{\overset{CH_3}{|}}{C}}-CH_2-;$$

[cyclohexyl with H]; [cyclohexenyl]; [phenyl]; [substituted phenyl]; [naphthyl];

$$-\underset{\underset{R^6}{|}}{\overset{\overset{R^5}{|}}{C}}-NH-$$

where $R^5$ and $R^6$ are hydrogen, alkyl with 1 to 8 carbon atoms, alkylthioalkyl with a total of 2 to 8 carbon atoms, $CH_3-S-$, alkoxyalkyl with a total of 2 to 8 carbon atoms, $CH_3O-$ or phenyl, or $$-\underset{\underset{}{|}}{\overset{\overset{R^7}{|}}{N}}-\overset{\overset{O}{\|}}{C}-\underset{\underset{}{|}}{\overset{\overset{R^8}{|}}{N}}-$$

where $R^7$ and $R^8$ are hydrogen, alkyl with 1 to 8 carbon atoms, allyl or phenyl.

18. The composition of claim 17 where Y is

[phenyl structure]

19. The composition of claim 18 where X is Y.

20. The composition of claim 19 where $R^1$ and $R^2$ are both ethyl.

21. The composition of claim 17 where the polymer is natural rubber, polybutadiene or butadienestyrene.

22. The composition of claim 17 including 0.05 to 5 parts per 100 parts by weight of the rubber of a vulcanization retarder.

23. The composition of claim 1 including 0.05 to 5 parts per 100 parts by weight of the rubber of a vulcanization retarder.

24. The composition of claim 23 including 0.05 to 10 parts of zinc oxide and 0.05 to 10 parts of stearic acid per 100 parts by weight of the rubber.

25. The composition of claim 17 including 0.05 to 10 parts of zinc oxide and 0.05 to 10 parts of stearic acid per 100 parts by weight of the rubber.

26. The composition of claim 1 including 0.05 to 10 parts of zinc oxide and 0.05 to 10 parts of stearic acid per 100 parts by weight of the rubber.

27. The composition of claim 26 including 5 to 100 parts of plasticizer oil per 100 parts by weight of the rubber.

28. The composition of claim 1 including 5 to 100 parts of plasticizer oil per 100 parts by weight of the rubber.

29. The cross-linked product obtained by heating the composition of claim 28 until cross-linking occurs.

30. The cross-linked product obtained by heating the composition of claim 27 until cross-linking occurs.

31. The cross-linked product obtained by heating the composition of claim 26 until cross-linking occurs.

32. The cross-linked product obtained by heating the composition of claim 25 until cross-linking occurs.

33. The cross-linked product obtained by heating the composition of claim 24 until cross-linking occurs.

34. The cross-linked product obtained by heating the composition of claim 23 until cross-linking occurs.

35. The cross-linked product obtained by heating the composition of claim 21 until cross-linking occurs.

36. The cross-linked product of claim 35 where Z is (3) and Alk is 2 to 3.

37. The cross-linked product obtained by heating the composition of claim 20 until cross-linking occurs.

38. The cross-linked product obtained by heating the composition of claim 19 until cross-linking occurs.

39. The cross-linked product obtained by heating the composition of claim 18 until cross-linking occurs.

40. The cross-linked product obtained by heating the composition of claim 17 until cross-linking occurs.

41. The cross-linked product obtained by heating the composition of claim 16 until cross-linking occurs.

42. The cross-linked product of claim 41 where Alk is 3.

43. The cross-linked product obtained by heating the composition of claim 15.

44. The cross-linked product obtained by heating the composition of claim 14.

45. The cross-linked product obtained by heating the composition of claim 13.

46. The cross-linked product obtained by heating the composition of claim 12 until cross-linking occurs.

47. The cross-linked product obtained by heating the composition of claim 11 until cross-linking occurs.

48. The cross-linked product of claim 47 which is free of carbon black.

49. The cross-linked product of claim 47 which contains 1 to 150 parts of carbon black per 100 parts of rubber.

50. The cross-linked product of claim 46 wherein the total of the siliceous filler and carbon black is not over 150 parts per 100 parts by rubber.

51. The cross-linked product obtained by heating the composition of claim 10 until cross-linking occurs.

52. The cross-linked product obtained by heating the composition of claim 9 until cross-linking occurs.

53. The cross-linked product obtained by heating the composition of claim 8 until cross-linking occurs.

54. The cross-linked product obtained by heating the composition of claim 7 until cross-linking occurs.

55. The cross-linked product obtained by heating the composition of claim 6 until cross-linking occurs.

56. The cross-linked product obtained by heating the composition of claim 5 until cross-linking occurs.

57. The cross-linked product of claim 55 where n is 2.

58. The cross-linked product obtained by heating the composition of claim 4 until cross-linking occurs.

59. The cross-linked product obtained by heating the composition of claim 3 until cross-linking occurs.

60. The cross-linked product obtained by heating the composition of claim 2 until cross-linking occurs.

61. The cross-linked product obtained by heating the composition of claim 1 until cross-linking occurs.

62. A process of preparing the product of claim 61 consisting of heating said composition at 100° to 200° C.

63. The process of claim 62 wherein the heating is for 3 to 200 minutes.

64. The composition of claim 1 wherein there are 10 to 250 parts of siliceous filler.

65. The cross-linked product obtained by heating the composition of claim 64 until cross-linking occurs.

66. A composition consisting essentially of the materials set forth in claim 1.

67. A composition according to claim 66 wherein the rubber is diene elastomer.

68. A composition according to claim 66 consisting of the stated materials.

69. The composition of claim 1 where Alk is a saturated aliphatic.

70. The composition of claim 69 wherein Alk has 2 to 4 carbon atoms.

71. The composition of claim 70 wherein Alk has 4 carbon atoms.

72. The composition of claim 71 where Z is (3), x is 2 to 4 and Alk is 2 to 5.

73. The composition of claim 72 where Alk is 2 to 4.

74. An elemental sulfur free cross-linking rubber composition consisting of (A) (1) a rubber capable of being cross-linked by sulfur and which is a halogen free rubber, (2) a siliceous filler in an amount of 1 to 300 parts per 100 parts by weight of the rubber, (3) carbon black in an amount of 0 to 300 parts by 100 parts by weight of the rubber, the total of siliceous filler and carbon black not exceeding about 300 parts per 100 parts by weight of the rubber, (4) a vulcanization accelerator for a sulfur cross-linkable rubber in an of 0.02 to 10 parts per 100 parts by weight of the rubber and (5) a sulfur containing organosilicon compound having the formula:

$$Z-Alk-S_x-Alk-Z$$

in which Z is:

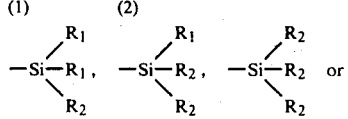

-continued (4)
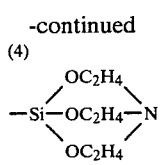

where $R_1$ is alkyl of 1 to 4 carbon atoms, cycloalkyl of 5 to 8 carbon atoms or phenyl, $R_2$ is alkoxy of 1 to 4 carbon atoms, cycloalkoxy of 5 to 8 carbon atoms or phenoxy, Alk is a divalent aliphatic hydrocarbon or a cyclic hydrocarbon group containing 1 to 8 carbon atoms and x is a number from 2 to 6 in an amount of 0.2 to 40 parts per 100 parts of siliceous filler, or (B) a composition including (A) and at least one of (b) zinc oxide in an amount of 0.05 to 10 parts per 100 parts by weight of the rubber, (7) stearic acid in an amount of 0.05 to 10 parts per 100 parts by weight of the rubber, (8) 5 to 100 parts of plasticizer oil per 100 parts by weight of the rubber, (9) a vulcanization retarder in an amount of 0.05 to 5 parts per 100 parts by weight of rubber and (10) an antiager.

75. The composition of claim 74 wherein the rubber is natural rubber, polybutadiene, polyisoprene, butadiene-styrene copolymer, butadiene-acrylonitrile copolymer, butyl rubber or ethylene-propylene non conjugated polyene terpolymer.

76. The composition of claim 75 wherein when the antiager is present it is present in an amount of about 2 to 3 parts per 100 parts by weight of the rubber.

77. The composition of claim 74 wherein the antiager is present in an amount of about 2 to 3 parts per 100 parts by weight of the rubber.

78. The composition of claim 74 wherein the antiager is present in an amount of 3 parts per 100 parts by weight of the rubber.

79. The composition of claim 74 wherein the antiager is present in an amount of 2.3 parts per 100 parts by weight of the rubber.

80. The composition of claim 74 wherein the vulcanization accelerator is tetramethylthiuramdisulfide.

81. The composition of claim 75 wherein the tetramethylthiuramdisulfide is present in an amount of 0.2 to 1 part per 100 parts by weight of the rubber.

82. The composition of claim 74 wherein the vulcanization accelerator is a tetraalkylthiuram monosulfide, a thiourea, a dithiocarbamate, a xanthogenate, a mercapto thiazole, a mercapto thiazoline, a mercaptotriazine, a sulfenamide, an amine, an amine-aldehyde, a guanidine, a bis triazine disulfide or dibenzothiazyl disulfide.

83. The composition of claim 82 wherein the accelerator is 2-[bis-(2-hydroxyethyl)-amine]-4,6-bis-mercapto-triazine,bis-1,2-ethylamino-4-diethylamino-triazinyl-6-yl)-disulfide; di-2-benzothiazyldisulfide; tetramethylthiurammonosulfide; N,N'-diphenylguanidine; N-cyclohexyl-2-benzothiazolsulfenamide; 2-mercaptobenzothiazole; zinc-N-diethyldithiocarbamate; 2-ethylamino-4-diethylamine-6-mercapto-s-triazine; 2-dimethylamino-4,6-bis-dimethylamino-thiotriazine; ethylene thiourea; butyraldehydeaniline or hexamethylenetetramine; benzothiazyl-N-sulfen-morpholide; or N-cyclohexyl-2-benzothiazole-sulfenamide.

* * * * *

UNITED STATES PATENT AND TRADEMARK OFFICE
CERTIFICATE OF CORRECTION

PATENT NO. : 4,229,333
DATED : October 21, 1980
INVENTOR(S) : WOLFF, Siegfried and TAN, Ewe Hong It is certified that error appears in the above—identified patent and that said Letters Patent is hereby corrected as shown below:

Claim 1, col. 24, line 68, change "by", first occurrence to --per--.

Claim 74, col. 28, line 51, change "by", first occurrence to --per--.

Claim 74, col. 28, line 52, after "total" insert --amount--.

Claim 74, col. 28, line 65, above the last formula insert --(3)--.

Claim 21, col. 26, last line, after "butadiene-styrene" insert --copolymer--.

Signed and Sealed this

Twenty-fourth Day of March 1981

[SEAL]

*Attest:*

RENE D. TEGTMEYER

*Attesting Officer*     *Acting Commissioner of Patents and Trademarks*